US006858856B2

(12) United States Patent
Balog et al.

(10) Patent No.: US 6,858,856 B2
(45) Date of Patent: Feb. 22, 2005

(54) COUNTERFEIT DETECTOR CASH REGISTER

(75) Inventors: James R. Balog, Somerset, NJ (US); Timothy C. Repp, Pleasant Valley, CT (US)

(73) Assignee: Royal Consumer Information Products, Inc., Somerset, NJ (US)

( * ) Notice: Subject to any disclaimer, the term of this patent is extended or adjusted under 35 U.S.C. 154(b) by 300 days.

(21) Appl. No.: 10/281,019

(22) Filed: Oct. 24, 2002

(65) Prior Publication Data

US 2004/0079906 A1 Apr. 29, 2004

(51) Int. Cl.[7] .................................................. G06K 5/00
(52) U.S. Cl. ....................................... 250/556; 250/239
(58) Field of Search ................................ 250/556, 239, 250/221, 566, 461.1, 484.2; 356/71; 194/207, 206, 203; 235/20, 10; D18/4.1, 4.3

(56) References Cited

U.S. PATENT DOCUMENTS

| | | | | |
|---|---|---|---|---|
| 3,618,765 | A | 11/1971 | Cooper | 209/122 |
| D306,310 | S | 2/1990 | Kobayashi et al. | D18/4 |
| 4,980,569 | A | 12/1990 | Crane et al. | 250/556 |
| 5,260,582 | A | 11/1993 | Danek et al. | 250/556 |
| 5,302,811 | A | 4/1994 | Fukatsu | 235/381 |
| 5,308,992 | A | 5/1994 | Crane et al. | 250/556 |
| 5,399,874 | A | 3/1995 | Gonsalves et al. | 250/556 |
| 5,434,427 | A | 7/1995 | Crane et al. | 250/556 |
| 5,468,971 | A | 11/1995 | Ebstein et al. | 250/556 |
| D394,667 | S | 5/1998 | Romano | D16/135 |
| D397,719 | S | 9/1998 | Masuda | D18/4 |
| D403,006 | S | 12/1998 | Romano | D16/135 |
| 5,874,742 | A | 2/1999 | Romano | 250/461.1 |
| 5,877,852 | A | 3/1999 | Schilbach et al. | 356/71 |
| 5,942,759 | A | 8/1999 | Romano | 250/461.1 |
| D454,150 | S | 3/2002 | Shigemura et al. | D18/4.1 |
| 6,491,215 | B1 | * 12/2002 | Irwin et al. | 235/375 |

FOREIGN PATENT DOCUMENTS

| | | |
|---|---|---|
| DE | 4404871 | 8/1995 |
| DE | 44 04 872 | 8/1995 |
| DE | 4407601 | 9/1995 |
| GB | 2354624 | 9/1999 |
| JP | 2000172952 | 6/2000 |
| WO | WO 01/24130 | 4/2001 |

* cited by examiner

*Primary Examiner*—Que T. Le
(74) *Attorney, Agent, or Firm*—Roberts & Roberts, LLP

(57) ABSTRACT

A counterfeit detector cash register which includes a housing defining an interior chamber, a keyboard on a top portion of the housing, an electrical data processor within the interior chamber, a data output device on the housing, a cash drawer, a counterfeit currency detector station within the housing, and an electrical power source. The counterfeit currency detector station includes a currency entry slot along a front of the housing, wherein paper currency is at least partially inserted into the housing. The station also includes an ultraviolet light source within the interior chamber of the housing, which emits ultraviolet light onto the paper currency while within the housing. The station further includes a viewing panel along a top portion of the housing, through which the paper currency is viewed while within the housing. The invention is economical in cost and space by eliminating the need for multiple machines.

20 Claims, 5 Drawing Sheets

COUNTERFEIT DETECTOR CASH REGISTER

BACKGROUND OF THE INVENTION

1. Field of the Invention

The present invention relates to the detection of counterfeit paper money. More particularly, it relates to a single unit counterfeit detector cash register.

2. Description of the Related Art

With modern improvements in copying methods, it has become relatively easy for counterfeiters to reproduce paper currency. The production of passable copies no longer requires the work of a skilled engraver. Photographic methods can be used to make accurate plates in a very short time. In addition, electrostatic copying equipment has been so perfected that reasonable color copies of legitimate notes can be made easily and rapidly. As a result, there has been a steadily growing amount of false currency and an increased cost to merchants and others who must absorb the loss when these copies are passed.

Several methods have been developed to detect counterfeit paper currency. One such method employs illumination under ultraviolet light. Because United States bills are printed on rag bond and use no brighteners, they possess characteristic optical properties. Under ordinary light, they will have an off-white appearance. Under ultraviolet illumination these materials will not fluoresce. However, papers containing wood pulp and brighteners will tend to fluoresce.

Recently, new U.S. currency has been developed having new security features including a polymer thread having fluorescent markings which are sensitive to ultraviolet light, and which are barely visible in ambient lighting conditions. Under intensified ultraviolet fluorescent lighting, the polymer thread will glow with a particular color for each denomination, e.g. red for U.S. $100 bill, yellow for U.S. $50 bill, etc., to indicate that the currency is authentic.

Various optical illumination machines have been developed which are capable of detecting counterfeit currency via ultraviolet illumination. Examples of such known machines are shown in U.S. Pat. No. 5,874,742, which teaches a counterfeit detection apparatus including a UV light fixture for projecting UV light rays onto paper currency, and U.S. Pat. No. 5,942,759 teaches a counterfeit detection apparatus having removable UV light fixture. Unfortunately, conventionally known machines are very expensive and it would not be possible for businesses such as supermarkets to purchase a machine to be placed along side each cash register of the business. Furthermore, the known machines are often too bulky and/or complex in design to be placed beside each cash register station.

Thus, it would be desirable to produce a cash register having built-in counterfeit detection capability for quickly and easily detecting counterfeit currency while also being convenient to use and economical in space and cost. The present invention provides a solution to this problem.

The invention provides a single apparatus which serves as both a counterfeit detector and cash register. The invention discloses a counterfeit detector cash register which includes a housing having an outer shell which defines an interior chamber. A keyboard is positioned on a top portion of the housing. The keyboard has a plurality of keys capable of entering data input signals into a data processor. An electrical data processor is within the interior chamber, which is capable of receiving data input signals entered from the keys of the keyboard, processing the data, and producing data output signals to be sent to a data output device. A data output device is positioned on the housing, and is capable of receiving and displaying data output signals produced and sent by the data processor. A cash drawer, for storing currency therein, is positioned along a front of the housing, This cash drawer can be slidably opened and closed. The invention may also include an additional utility drawer for storing pens, checks, coupons, and the like. An important feature of the present invention is a counterfeit currency detector station positioned within the housing. The counterfeit currency detector station includes a currency entry slot along a front of the housing, wherein paper currency may be at least partially inserted into the housing. The station also includes an ultraviolet light source within the interior chamber of the housing, which emits ultraviolet light onto the paper currency while the currency is within the housing. The station further includes a viewing panel positioned along a top portion of the housing, through which the paper currency may be viewed while the currency is within the housing. The invention also includes an electrical power source for providing power to the keyboard, the electrical data processor, the data output device, and the ultraviolet light source.

The counterfeit detector cash register of the invention is economical in cost and space by eliminating the need for multiple machines. Furthermore, persons of limited training will be able to quickly and easily inspect potentially counterfeit paper currency prior to commingling such counterfeit currency with authentic currency in the cash drawer.

SUMMARY OF THE INVENTION

The invention provides a counterfeit currency detector cash register which comprises:

a) a housing comprising an outer shell which defines an interior chamber;

b) a keyboard positioned on a top portion of the housing, which keyboard comprises a plurality of keys capable of entering data input signals into a data processor;

c) an electrical data processor within the interior chamber, which data processor is capable of receiving data input signals entered from the keys of the keyboard, processing the data, and producing data output signals to be sent to a data output device;

d) a data output device positioned on the housing, which data output device is capable of receiving and displaying data output signals produced and sent by the data processor;

e) a cash drawer positioned along a front of the housing, which cash drawer is capable of storing currency therein, and which cash drawer can be slidably opened and closed;

f) a counterfeit currency detector station positioned within the housing, which counterfeit currency detector station comprises:

- i) a currency entry slot positioned along a front of the housing, wherein paper currency may be at least partially inserted into the housing;
- ii) an ultraviolet light source within the interior chamber of the housing, which ultraviolet light source is capable of emitting ultraviolet light onto the paper currency while said paper currency is within the housing; and
- iii) a viewing panel positioned along a top portion of the housing, through which the paper currency may be viewed while said paper currency is within the housing; and g) an electrical power source for providing power to the keyboard, the electrical data processor, the data output device, and the ultraviolet light source.

The invention also provides a method for detecting counterfeit currency, which comprises:

I) providing a counterfeit currency detector cash register which comprises:

a) a housing comprising an outer shell which defines an interior chamber;

b) a keyboard positioned on a top portion of the housing, which keyboard comprises a plurality of keys capable of entering data input signals into a data processor;

c) an electrical data processor within the interior chamber, which data processor is capable of receiving data input signals entered from the keys of the keyboard, processing the data, and producing data output signals to be sent to a data output device;

d) a data output device positioned on the housing, which data output device is capable of receiving and displaying data output signals produced and sent by the data processor;

e) a cash drawer positioned along a front of the housing, which cash drawer is capable of storing currency therein, and which cash drawer can be slidably opened and closed;

f) a counterfeit currency detector station positioned within the housing, which counterfeit currency detector station comprises:

i) a currency entry slot positioned along a front of the housing, wherein paper currency may be at least partially inserted into the housing;

ii) an ultraviolet light source within the interior chamber of the housing, which ultraviolet light source is capable of emitting ultraviolet light onto the paper currency while said paper currency is within the housing; and iii) a viewing panel positioned along a top portion of the housing, through which the paper currency may be viewed while said paper currency is within the housing; and g) an electrical power source for providing power to the keyboard, the electrical data processor, the data output device, and the ultraviolet light source;

II) at least partially inserting paper currency into the housing via the currency entry slot;

III) emitting ultraviolet light from the ultraviolet light source onto the paper currency to thereby illuminate the paper currency;

IV) viewing the ultraviolet light illuminated paper currency through the viewing panel to determine whether or not the paper currency is counterfeit currency; and V) optionally storing any desired currency within the cash drawer.

The invention further provides a method for completing a transaction which comprises:

I) providing a counterfeit currency detector cash register which comprises:

a) a housing comprising an outer shell which defines an interior chamber;

b) a keyboard positioned on a top portion of the housing, which keyboard comprises a plurality of keys capable of entering data input signals into a data processor;

c) an electrical data processor within the interior chamber, which data processor is capable of receiving data input signals entered from the keys of the keyboard, processing the data, and producing data output signals to be sent to a data output device;

d) a data output device positioned on the housing, which data output device is capable of receiving and displaying data output signals produced and sent by the data processor;

e) a cash drawer positioned along a front of the housing, which cash drawer is capable of storing currency therein, and which cash drawer can be slidably opened and closed;

f) a counterfeit currency detector station positioned within the housing, which counterfeit currency detector station comprises:

i) a currency entry slot positioned along a front of the housing, wherein paper currency may be at least partially inserted into the housing;

ii) an ultraviolet light source within the interior chamber of the housing, which ultraviolet light source is capable of emitting ultraviolet light onto the paper currency while said paper currency is within the housing; and iii) a viewing panel positioned along a top portion of the housing, through which the paper currency may be viewed while said paper currency is within the housing; and g) an electrical power source for providing power to the keyboard, the electrical data processor, the-data output device, and the ultraviolet light source.

II) entering data input signals relating to a transaction into the electrical data processor of the cash register via the keys of the keyboard;

III) viewing the data output signals relating to the transaction via the data output device;

IV) collecting a paper currency payment, which paper currency payment corresponds to the data output signals relating to the transaction;

V) at least partially inserting the paper currency into the housing via the currency entry slot;

VI) emitting ultraviolet light from the ultraviolet light source onto the paper currency to thereby illuminate said paper currency;

VII) viewing the ultraviolet light illuminated paper currency through the viewing panel to determine whether or not said paper currency is counterfeit currency; and VIII) optionally storing any non-counterfeit currency within the cash drawer.

DETAILED DESCRIPTION OF THE PREFERRED EMBODIMENT

Figure 1:
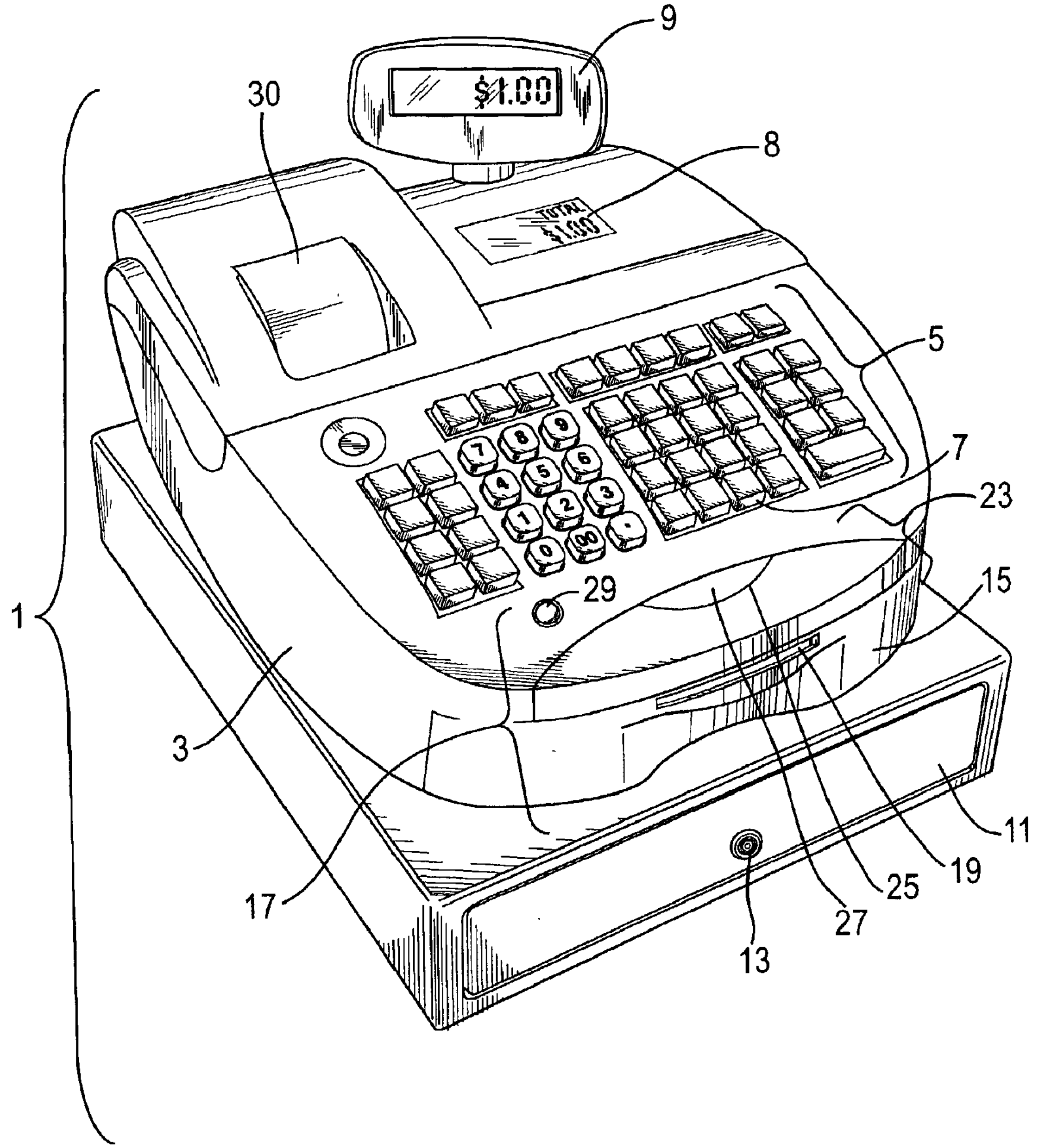
FIG. 1 shows a perspective view of a counterfeit currency detector cash register of the present invention.

The present invention provides a counterfeit detector cash register 1, shown in FIGS. 1–5. As shown in FIG. 1, the cash register 1 comprises a housing 3 comprising an outer shell which defines an interior chamber. The housing 3 may be formed into any suitable shape, but it preferably comprises six sides including a front and back, a top and bottom, and two sides. The outer shell of housing 3 may comprise any suitable material known in the art for the formation of cash register machines, such as plastic, metal, and the like. The interior chamber is preferably sufficiently sized to contain various internal machinery components such as wiring, or in particular, a data processor as described below.

As shown in FIG. 1, a keyboard 5 is positioned on a top portion of the housing 3, which keyboard 5 comprises a plurality of keys 7 capable of entering data input signals, such as numerical and/or alphabetical input signals, into a data processor or the like. Suitable keyboards and keyboard materials are known by those skilled in the art.

The invention further comprises an electrical data processor which is housed within the interior chamber of the housing 3. The data processor is capable of receiving data input signals entered via the keys 7 of the keyboard 5. The data processor is also capable of processing the data, and producing data output signals to be sent to an output device. Suitable electrical data processors for cash registers are well known to those skilled in the art, and are preferably capable of receiving and producing numerical and/or alphabetical data.

As shown in FIG. 1, one or more data output devices 8 and 9 are positioned on the housing 3. The data output devices 8 and 9 are capable of receiving and displaying data output signals which are produced and sent by the data processor. The data output devices 8 and 9 preferably comprise a display or screen, such as a liquid crystal display (LCD), light emitting diode (LED), or the like, for displaying such data output signals. The data output devices 8 and 9 may be positioned at any suitable location on the housing 3. In a preferred embodiment, one data output device 9 is positioned on a top portion of the housing 3 so that it can be easily viewed by a customer. Output device 9 can be raised and lowered, tilted and rotated in order to aid customer viewing. In another embodiment, a data output device 8 is positioned on a front side of the housing to be easily viewed by the operator.

FIG. 1 shows a cash drawer 11 positioned along a front of the housing 3. The cash drawer 11 is preferably slidably opened and closed, and is capable of storing currency therein. The cash drawer 11 preferably comprises a lock 13. The cash register 1 may also comprise an optional utility drawer 15, as shown in FIGS. 1 and 2, for the storage of other items such as checks, pens, coupons, and the like.

Figure 2:
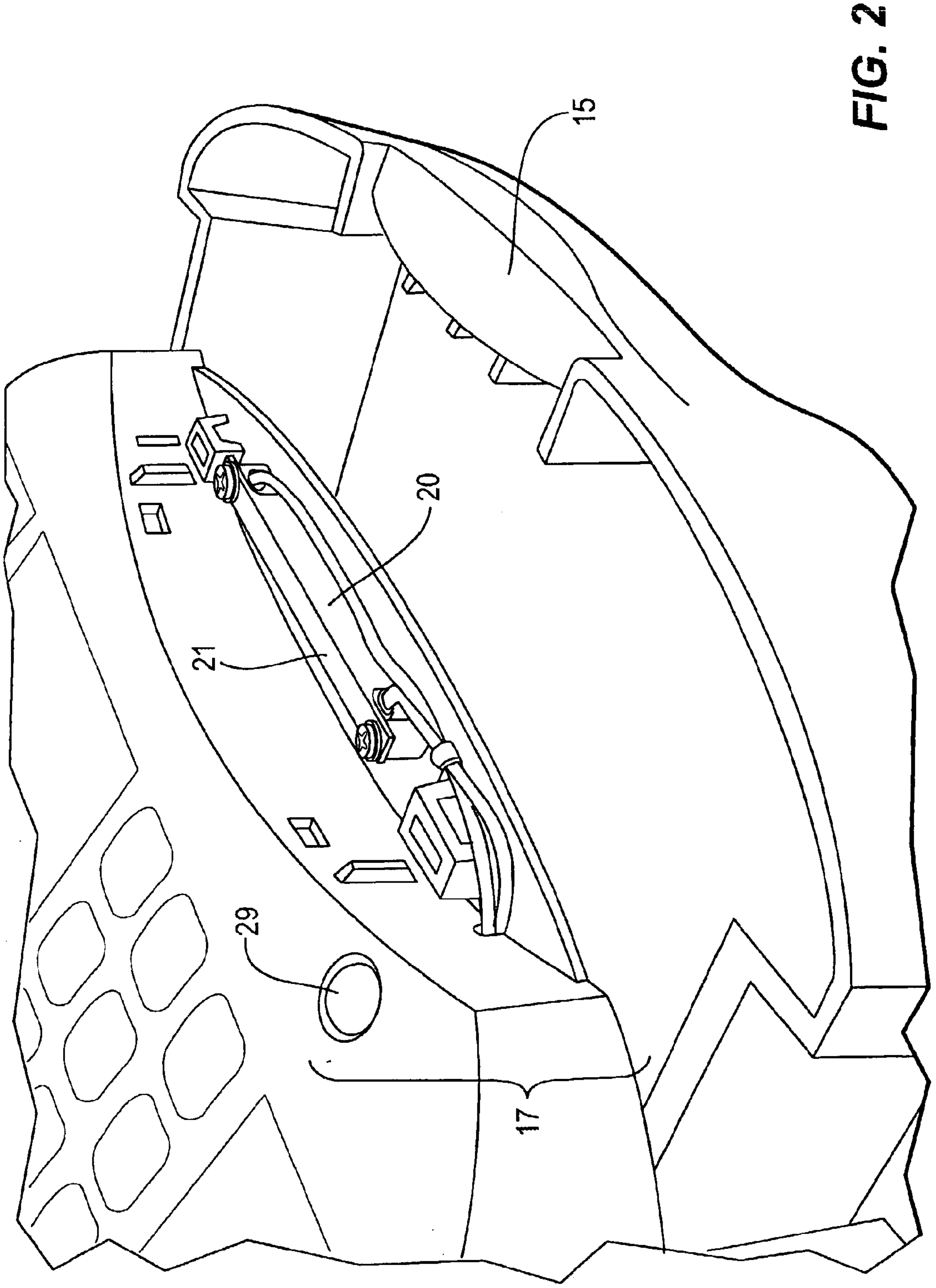
FIG. 2 shows a perspective view of a counterfeit currency detector station, and utility drawer of the present invention.
Figure 3:
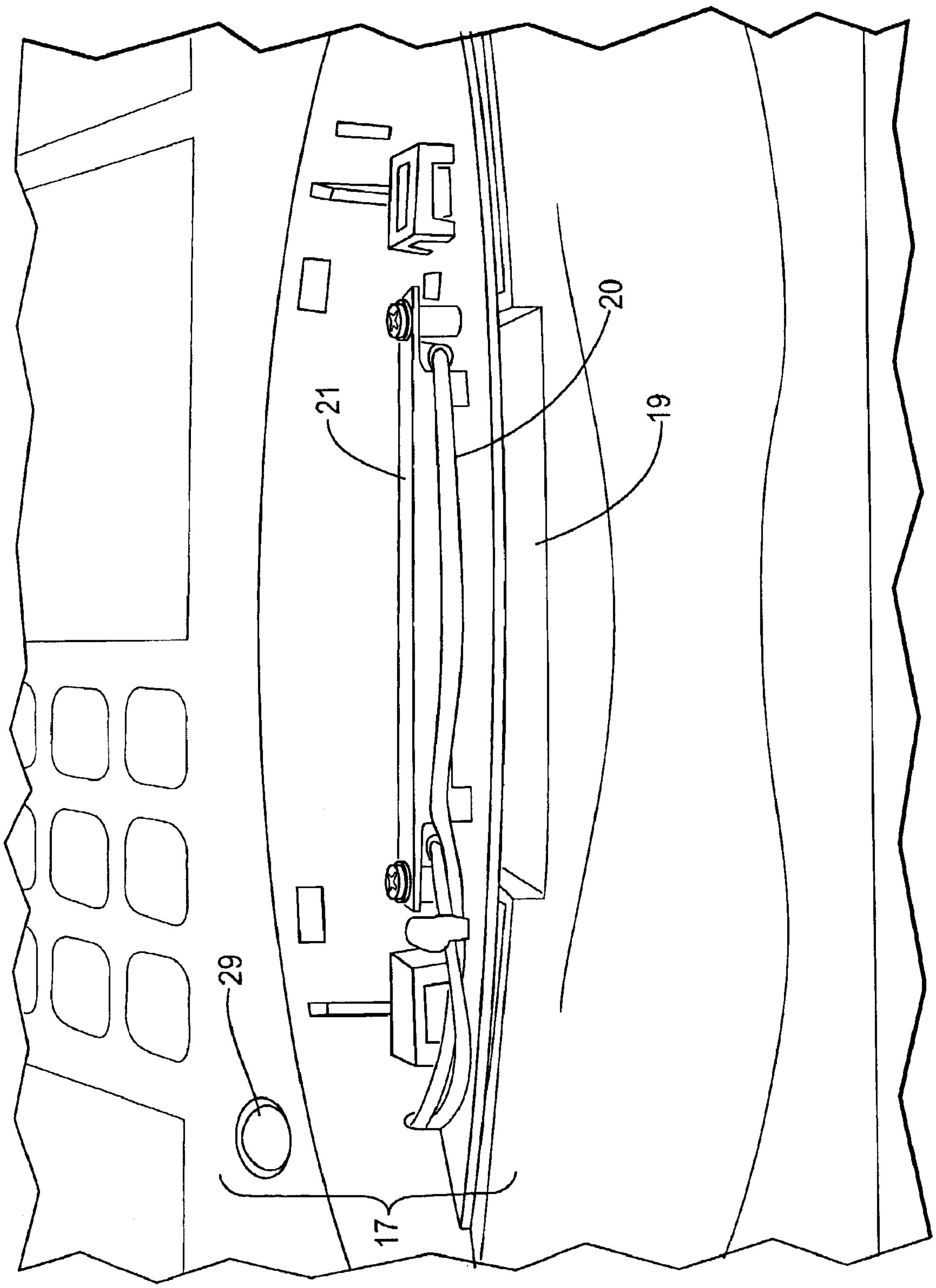
FIG. 3 shows a front view of a counterfeit currency detector station of the present invention.

An important feature of the invention, shown in FIGS. 1–3, is a counterfeit currency detector station 17 which is positioned within the housing 3. As shown in FIG. 1, the counterfeit currency detector station 17 includes a currency entry slot 19 positioned along a front of the housing 3, wherein paper currency may be at least partially inserted into the housing 3.

The counterfeit currency detector station 17 further comprises an ultraviolet light source 20, shown in FIGS. 2 and 3, within the interior chamber of the housing 3, which ultraviolet light source 20 is capable of emitting ultraviolet light onto the paper currency while the paper currency is within the housing 3. One example of a suitable ultraviolet light source comprises an ultraviolet lamp. Such ultraviolet lamps are typically purchased pre-assembled, and comprise a UV light bulb, rubber end caps, a connector and a cable. The UV light bulb preferably comprises a lead-glass tube and preferably contains neon and/or argon gas therein. The UV light bulb preferably operates at a frequency of from about 20 kHz to about 60 kHz, more preferably from about 25 kHz to about 55 kHz, and most preferably from about 35 kHz to about 45 kHz. Such ultraviolet lamps may be purchased commercially from NanJing Lampus Photo Electron Co. Ltd. A reflector 21 may be positioned adjacent to the ultraviolet light source 20 to thereby reflect the ultraviolet light directly onto the currency.

The counterfeit currency detector station 17 further comprises a viewing panel 23, shown in FIG. 1, which is positioned along a top portion of the housing 3, through which the paper currency may be viewed while it is within the housing 3. In a preferred embodiment, the viewing panel 23 comprises an opening 25 fitted with a lens 27. In another embodiment, the viewing panel 23 comprises an opening 25 without a lens.

Figure 5:
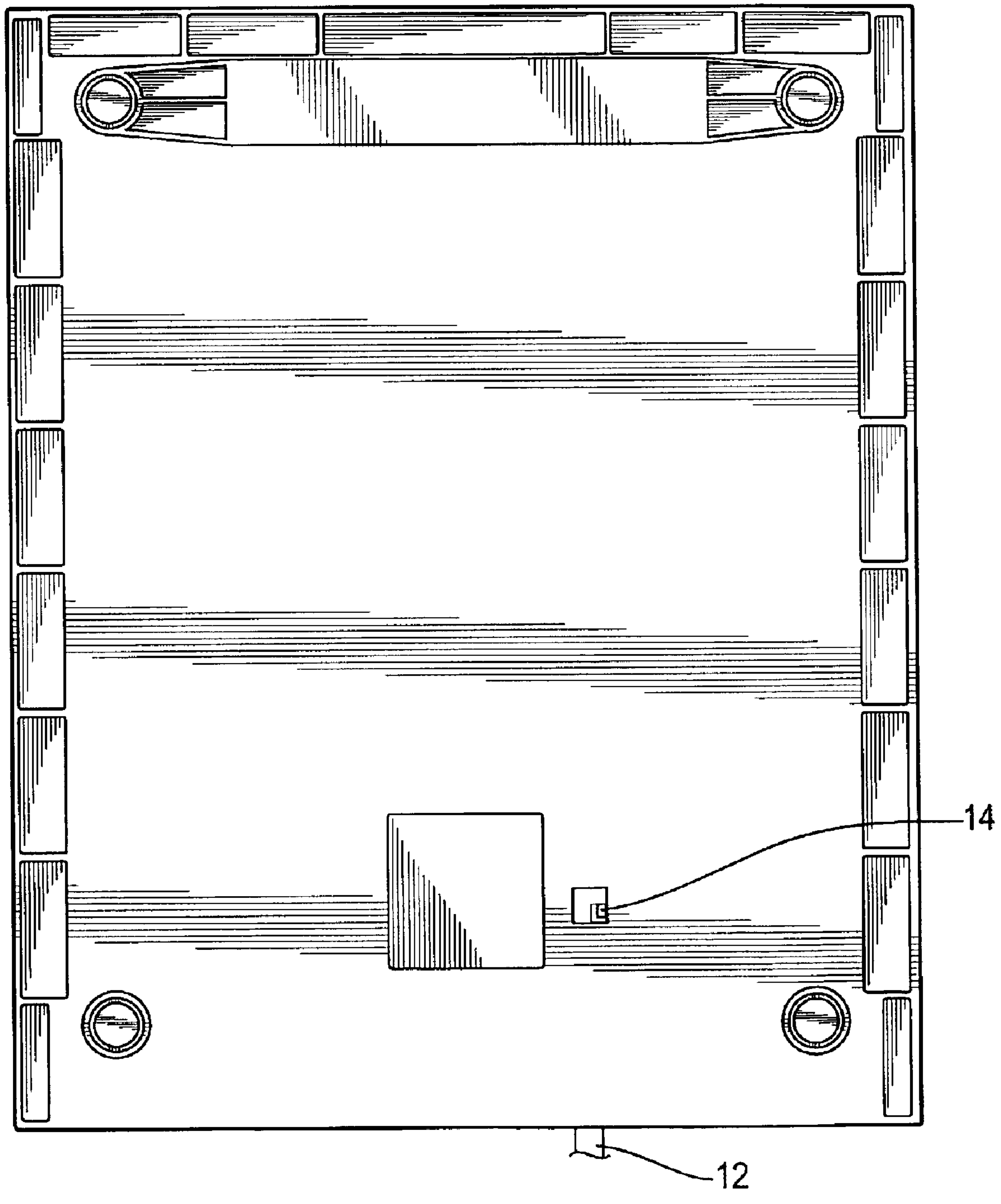
FIG. 5 shows a bottom view of a counterfeit currency detector cash register of the present invention.

The cash register 1 further comprises an electrical power source 12, as seen in FIG. 5, for providing power to the keyboard 5, the electrical data processor, the data output device 9, and the ultraviolet light source 20. The electrical power source preferably comprises a connection to an electrical wall socket. In another embodiment, the cash register 1 may further comprise an additional power source such an internal battery for back-up memory retention. As also shown in FIG. 5, the cash register preferably comprises an emergency catch or release 14 which is capable of releasing the cash drawer in the event of a power outage.

The cash register 1 preferably comprises a power switch 29, shown in FIGS. 1–3, for actuating the ultraviolet light source 20, such that the ultraviolet light source 20 may be turned ON and OFF independently from the other electrically powered features such as the keyboard 5, the electrical data processor, and the data output device 9, such as when paper currency is to be viewed. When no paper currency is to be viewed, it is preferred that the ultraviolet light source 20 remains off. It is preferred that the ultraviolet light source 20 draws power from the same power source as the rest of the electrically powered features of the register.

The cash register 1 of the invention preferably further comprises a printer component capable of printing receipts 30. The printer is preferably positioned within the interior chamber of the housing 3. The printer is capable of printing a paper receipt 30, as shown in FIG. 1, and discharging the receipt from the interior chamber of the housing 3.

Figure 4:
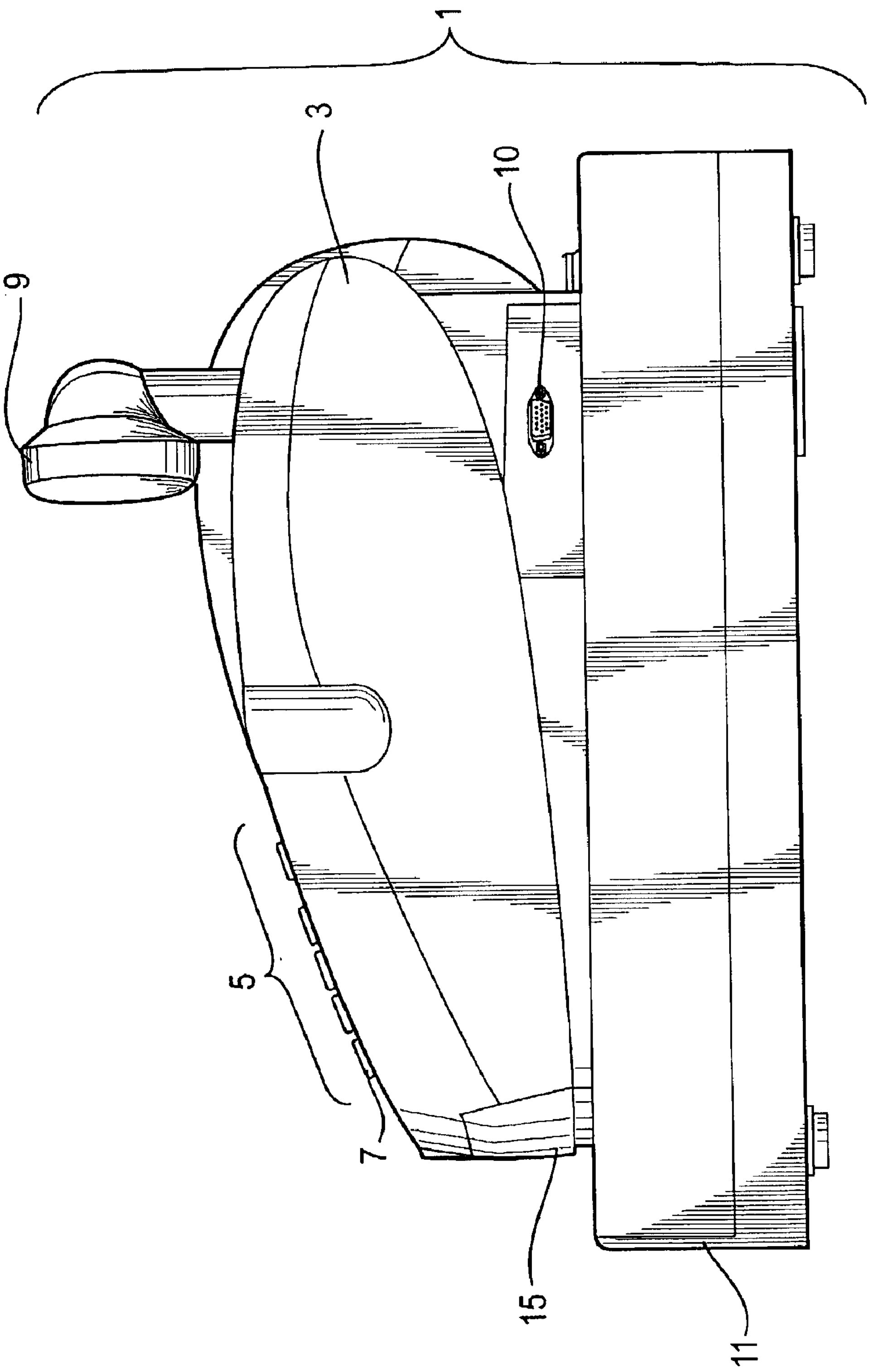
FIG. 4 shows a side view of a counterfeit currency detector cash register of the present invention.

The cash register 1 may also further comprise at least one serial port 10 positioned on the housing, as shown in FIG. 4 This serial port 10, if present, may be used to connect one or more external data entry sources to the electrical data processor, such that the external data entry source may enter data input signals into the electrical data processor. Examples of suitable external data entry sources for such connections nonexclusively include handheld or stationary bar code scanners or readers, personal computers (PCs), and the like, via a standard serial cable. In one preferred embodiment, a bar code scanner is connected to the register via the serial port, and is used to scan a UPC bar code from a product during the initial programming of the register, and/or while scanning a product during a check-out process. In another preferred embodiment, a PC is connected to the register via the serial port, and is used to download data reports from the cash register to the PC so that such data can be electronically stored as needed, or to import such data into accounting programs and the like.

In using a counterfeit detector cash register 1 of the invention to detect counterfeit currency, a user at least partially inserts paper currency into the counterfeit currency detector station 17 via the currency entry slot 19. In one preferred embodiment, the paper currency is partially inserted into the entry slot 19. In an alternate embodiment, the paper currency is fully inserted into the entry slot 19. Ultraviolet light is then emitted from the ultraviolet light source 20 onto the paper currency to thereby illuminate the paper currency. Preferably, the user causes the ultraviolet light to be emitted from the ultraviolet light source 20 by engaging a light source power switch 29. The user then views the ultraviolet light illuminated paper currency through the viewing panel 23 to assist in determining determine whether or not the paper currency is counterfeit currency. Once this determination is made, the user may optionally store any desired currency within the cash drawer 11.

In another embodiment of the invention, a counterfeit detector cash register 1 of the invention is used to complete a transaction, such as a sale transaction or the like. A user enters data input signals relating to the transaction into the electrical data processor of the cash register 1 via the keys 7 of the keyboard 5 or the bar code scanner via the serial port. The user views the data output signals relating to the transaction via the data output device 9, and collects a paper currency payment which corresponds to the data output signals relating to the transaction. As described above, the user then at least partially inserts paper currency into the counterfeit currency detector station 17 via the currency entry slot 19. Ultraviolet light is emitted from the ultraviolet light source 20 onto the paper currency to thereby illuminate the paper currency. As stated above, it is preferred that the user causes the ultraviolet light to be emitted from the ultraviolet light source 20 by engaging a light source power switch 29. The user then views the ultraviolet light illuminated paper currency through the viewing panel 23 to aid in determining whether or not the paper currency is counterfeit currency. Once this determination is made, the user may optionally store any desired currency within the cash drawer 11 and receipt 10 is printed to complete the transaction.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A counterfeit currency detector cash register which comprises:

a) a housing comprising an outer shell which defines an interior chamber;

b) a keyboard positioned on a top portion of the housing, which keyboard comprises a plurality of keys capable of entering data input signals into a data processor;

c) an electrical data processor within the interior chamber, which data processor is capable of receiving data input signals entered from the keys of the keyboard, processing the data, and producing data output signals to be sent to a data output device;

d) a data output device positioned on the housing, which data output device is capable of receiving and displaying data output signals produced and sent by the data processor;

e) a cash drawer positioned along a front of the housing, which cash drawer is capable of storing currency therein, and which cash drawer can be slidably opened and closed;

f) a counterfeit currency detector station positioned within the housing, which counterfeit currency detector station comprises:

i) a currency entry slot positioned along a front of the housing, wherein paper currency may be at least partially inserted into the housing;

ii) an ultraviolet light source within the interior chamber of the housing, which ultraviolet light source is capable of emitting ultraviolet light onto the paper currency while said paper currency is within the housing; and iii) a viewing panel positioned along a top portion of the housing, through which the paper currency may be viewed while said paper currency is within the housing; and g) an electrical power source for providing power to the keyboard, the electrical data processor, the data output device, and the ultraviolet light source.

2. The cash register of claim 1 further comprising a power switch for the ultraviolet light source.

3. The cash register of claim 1 wherein the ultraviolet light source comprises an ultraviolet lamp.

4. The cash register of claim 1 wherein the electrical power source comprises an internal battery.

5. The cash register of claim 1 wherein the electrical power source comprises a connection to an electrical socket.

6. The cash register of claim 1 wherein the viewing panel comprises an opening fitted with a lens.

7. The cash register of claim 1 wherein the viewing panel comprises an opening without a lens.

8. The cash register of claim 1 wherein the cash drawer comprises a lock.

9. The cash register of claim 1 further comprising a printer for printing paper receipts.

10. A method for detecting counterfeit currency, which comprises:

I) providing a counterfeit currency detector cash register which comprises:

a) a housing comprising an outer shell which defines an interior chamber;

b) a keyboard positioned on a top portion of the housing, which keyboard comprises a plurality of keys capable of entering data input signals into a data processor;

c) an electrical data processor within the interior chamber, which data processor is capable of receiving data input signals entered from the keys of the keyboard, processing the data, and producing data output signals to be sent to a data output device;

d) a data output device positioned on the housing, which data output device is capable of receiving and displaying data output signals produced and sent by the data processor;

e) a cash drawer positioned along a front of the housing, which cash drawer is capable of storing currency therein, and which cash drawer can be slidably opened and closed;

f) a counterfeit currency detector station positioned within the housing, which counterfeit currency detector station comprises:

i) a currency entry slot positioned along a front of the housing, wherein paper currency may be at least partially inserted into the housing;

ii) an ultraviolet light source within the interior chamber of the housing, which ultraviolet light source is capable of emitting ultraviolet light onto the paper currency while said paper currency is within the housing; and iii) a viewing panel positioned along a top portion of the housing, through which the paper currency may be viewed while said paper currency is within the housing; and g) an electrical power source for providing power to the keyboard, the electrical data processor, the data output device, and the ultraviolet light source;

II) at least partially inserting paper currency into the housing via the currency entry slot;

III) emitting ultraviolet light from the ultraviolet light source onto the paper currency to thereby illuminate the paper currency;

IV) viewing the ultraviolet light illuminated paper currency through the viewing panel to determine whether or not the paper currency is counterfeit currency; and V) optionally storing any desired currency within the cash drawer.

11. The method of claim 10 wherein the cash register further comprises a power switch for the ultraviolet light source.

12. The method of claim 10 wherein the ultraviolet light source comprises an ultraviolet lamp.

13. The method of claim 10 wherein the electrical power source comprises an internal battery.

14. The method of claim 10 wherein the electrical power source comprises a connection to an electrical socket.

15. The method of claim 10 wherein the viewing panel comprises an opening fitted with a lens.

16. The method of claim 10 wherein the viewing panel comprises an opening without a lens.

17. The method of claim 10 wherein the cash register further comprises a printer for printing paper receipts.

18. A method for completing a transaction which comprises:

I) providing a counterfeit currency detector cash register which comprises:

a) a housing comprising an outer shell which defines an interior chamber;

b) a keyboard positioned on a top portion of the housing, which keyboard comprises a plurality of keys capable of entering data input signals into a data processor;

c) an electrical data processor within the interior chamber, which data processor is capable of receiving data input signals entered from the keys of the keyboard, processing the data, and producing data output signals to be sent to a data output device;

d) a data output device positioned on the housing, which data output device is capable of receiving and displaying data output signals produced and sent by the data processor;

e) a cash drawer positioned along a front of the housing, which cash drawer is capable of storing currency therein, and which cash drawer can be slidably opened and closed;

f) a counterfeit currency detector station positioned within the housing, which counterfeit currency detector station comprises:

i) a currency entry slot positioned along a front of the housing, wherein paper currency may be at least partially inserted into the housing;

ii) an ultraviolet light source within the interior chamber of the housing, which ultraviolet light source is capable of emitting ultraviolet light onto the paper currency while said paper currency is within the housing; and iii) a viewing panel positioned along a top portion of the housing, through which the paper currency may be viewed while said paper currency is within the housing; and g) an electrical power source for providing power to the keyboard, the electrical data processor, the data output device, and the ultraviolet light source.

II) entering data input signals relating to a transaction into the electrical data processor of the cash register via the keys of the keyboard;

III) viewing the data output signals relating to the transaction via the data output device;

IV) collecting a paper currency payment, which paper currency payment corresponds to the data output signals relating to the transaction;

V) at least partially inserting the paper currency into the housing via the currency entry slot;

VI) emitting ultraviolet light from the ultraviolet light source onto the paper currency to thereby illuminate said paper currency;

VII) viewing the ultraviolet light illuminated paper currency through the viewing panel to determine whether or not said paper currency is counterfeit currency; and VIII) optionally storing any non-counterfeit currency within the cash drawer.

19. The method of claim 18 wherein the cash register further comprises a printer for printing paper receipts.

20. The method of claim 19 further comprising the step of providing of printing a paper receipt relating to the transaction.

* * * * *